US011242245B2

(12) United States Patent
Alsolami et al.

(10) Patent No.: US 11,242,245 B2
(45) Date of Patent: Feb. 8, 2022

(54) CATALYST CARRIER FOR STEAM REFORMING PROCESSES

(71) Applicant: Saudi Arabian Oil Company, Dhahran (SA)

(72) Inventors: Bandar H. Alsolami, Dhahran (SA); Bandar A. Fadhel, Dhahran (SA); Rami Bamagain, Dhahran (SA); Mohammed A. Albuali, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/775,096

(22) Filed: Jan. 28, 2020

(65) Prior Publication Data

US 2021/0229993 A1 Jul. 29, 2021

(51) Int. Cl.
*C01B 3/40* (2006.01)
*B01J 23/02* (2006.01)
(Continued)

(52) U.S. Cl.
CPC .......... *C01B 3/40* (2013.01); *B01J 23/02* (2013.01); *B01J 23/78* (2013.01); *B01J 35/023* (2013.01);
(Continued)

(58) Field of Classification Search
CPC .............. C01B 3/40; C01B 2203/1082; C01B 2203/0244; C01B 2203/1241; C01B 32/40; C01B 2203/0233; C01B 2203/0238; C01B 2203/1041; C01B 2203/1623; C01B 2203/1638; C01B 2203/1058; C01B 3/384; B01J 35/026; B01J 35/023; B01J 23/02; B01J 23/78; B01J 21/04; B01J 37/009; B01J 2523/00
See application file for complete search history.

(56) References Cited

U.S. PATENT DOCUMENTS 4,017,425 A 4/1977 Shiao
4,451,578 A 5/1984 Setzer et al.
(Continued)

FOREIGN PATENT DOCUMENTS

CN 104627960 A 5/2015
CN 105478120 A 4/2016
(Continued)

OTHER PUBLICATIONS

Alharthi et al., "Hydrocarbon Cracking Over Red Mud and Modified Red Mud Samples," Journal of Sustainable Metallurgy 2:387-393, 2016.
(Continued)

*Primary Examiner* — Anthony J Zimmer
*Assistant Examiner* — Syed T Iqbal
(74) *Attorney, Agent, or Firm* — Bracewell LLP; Constance G. Rhebergen; Kevin R. Tamm

(57) ABSTRACT

Methods for steam reforming with a red mud catalyst support composition, one method including providing a methane feed and a steam feed to react over the red mud catalyst support composition at increased temperature and increased pressure to produce synthesis gas comprising $H_2$ and CO, the composition comprising red mud material produced from an alumina extraction process from bauxite ore.

14 Claims, 1 Drawing Sheet

(51) Int. Cl.
  *B01J 23/78* (2006.01)
  *B01J 35/02* (2006.01)
  *C01B 3/48* (2006.01)
(52) U.S. Cl.
  CPC .............. *B01J 35/026* (2013.01); *C01B 3/48* (2013.01); *C01B 2203/0233* (2013.01); *C01B 2203/0283* (2013.01); *C01B 2203/1082* (2013.01); *C01B 2203/1241* (2013.01)

(56) References Cited

U.S. PATENT DOCUMENTS

| | | | |
|---|---|---|---|
| 6,340,437 | B1 * | 1/2002 | Yagi .................. B01J 23/40 252/373 |
| 10,179,326 | B2 | 1/2019 | Basset et al. |
| 2003/0024806 | A1 * | 2/2003 | Foret .................. C10J 3/54 204/164 |
| 2014/0369907 | A1 | 12/2014 | Boudreault et al. |
| 2016/0129423 | A1 * | 5/2016 | Basset .................. C07C 2/76 423/651 |
| 2019/0308183 | A1 | 10/2019 | Agblevor et al. |

FOREIGN PATENT DOCUMENTS

| | | |
|---|---|---|
| CN | 107433200 A | 12/2017 |
| CN | 105170155 B | 5/2018 |
| GB | 714284 A | 8/1954 |
| GB | 916216 A | 1/1963 |
| JP | S60203694 A | 10/1985 |
| JP | 2007084389 A | 4/2007 |
| RU | 2542177 C1 | 2/2015 |
| WO | 0000285 A1 | 1/2000 |
| WO | 2010118133 A1 | 10/2010 |
| WO | 2019138002 A1 | 7/2019 |

OTHER PUBLICATIONS

Balakrishnan et al., "Hydrogen production from methane in the presence of red mud—making mud magnetic," Green Chemistry, 11, 42-47, 2009.
Balakrishnan et al., "Waste materials—catalytic opportunities: an overview of the application of large scale waste materials as resources for catalytic applications," Green Chemistry, 2011, 13, 16.
Bennett et al., "Catalytic Applications of Waste Derived Materials", Journal of Materials Chemistry A, pp. 1-22, 2013.
Dulger Irdem et al. "Steam Reforming of Tar Derived from Walnut Shell and Almond Shell Gasification on Red Mud and Iron-Ceria Catalysts", Energy&Fuels, 2014.
Fang et al., "A Nanomesoporous Catalyst from Modified Red Mud and Its Application for Methane Decomposition to Hydrogen Production," Journal of Nanomaterials, Hindawi, 2016.
Liu et al., "Preparation of Modified Red Mud-Supported Fe Catalysts for Hydrogen Production by Catalytic Methane Decomposition," Journal of Nanomaterials, Article ID 8623463, 2017.
Ortiz et al. "Hydrogen production with CO2 capture by coupling steam reforming of methane and chemical-looping combustion: Use of an iron-based waste product as oxygen carrier burning a PSA tail gas," Journal of Power Sources, 196, pp. 4370-4381, 2011.
U.S. Appl. No. 16/775,019, "Nickel-Containing Catalyst Composition Having Enhanced Acidity for Dry Reforming Processes", filed Jan. 28, 2020.
U.S. Appl. No. 16/775,035, "Nickel-Containing Catalyst Composition Having Enhanced Acidity for Steam Reforming Processes", filed Jan. 28, 2020.
U.S. Appl. No. 16/775,050, "Nickel-Containing Catalyst Composition Having Enhanced Acidity for Autothermal Reforming Processes", filed Jan. 28, 2020.
U.S. Appl. No. 16/775,063, "Nickel-Containing Catalyst Composition Having Enhanced Acidity for Bi-Reforming Processes", filed Jan. 28, 2020.
U.S. Appl. No. 16/775,096, "Catalyst Carrier for Steam Reforming Processes", filed Jan. 28, 2020.
U.S. Appl. No. 16/775,102, "Catalyst Carrier for Autothermal Reforming Processes", filed Jan. 28, 2020.
U.S. Appl. No. 16/775,119, "Catalyst Carrier for Bi-Reforming Processes", filed Jan. 28, 2020.
U.S. Appl. No. 16/775,135, "Catalyst Compositions Having Enhanced Acidity for Dry Reforming Processes", filed Jan. 28, 2020.
U.S. Appl. No. 16/775,147, "Catalyst Compositions Having Enhanced Acidity for Steam Reforming Processes", filed Jan. 28, 2020.
U.S. Appl. No. 16/775,158, "Catalyst Compositions Having Enhanced Acidity for Autothermal Reforming Processes", filed Jan. 28, 2020.
U.S. Appl. No. 16/775,167, "Catalyst Compositions Having Enhanced Acidity for Bi-Reforming Processes", filed Jan. 28, 2020.
International Search Report and Written Opinion of PCT Application No. PCT/US2021/015131 dated May 11, 2021: pp. 1-12.
Theofanidis et al., "Enhanced carbon-resistant dry reforming Fe—Ni catalyst: Role of Fe," ACS Catal., vol. 5(5), May 26, 2015: pp. 3028-3039.
International Search Report and Written Opinion for PCT Application No. PCT/US2021/015132 dated Mar. 29, 2021: pp. 1-12.
International Search Report and Written Opinion for PCT Application No. PCT/US2021/015133 dated Mar. 29, 2021: pp. 1-12.
International Search Report and Written Opinion for PCT Application No. PCT/US2021/015134 dated Mar. 29, 2021: pp. 1-12.
International Search Report and Written Opinion for PCT Application No. PCT/US2021/015188 dated Mar. 29, 2021: pp. 1-11.
International Search Report and Written Opinion for PCT Application No. PCT/US2021/015191 dated Mar. 29, 2021: pp. 1-11.
International Search Report and Written Opinion for PCT Application No. PCT/US2021/015194 dated Mar. 29, 2021: pp. 1-12.
International Search Report and Written Opinion for PCT Application No. PCT/US2021/015196 dated Apr. 14, 2021: pp. 1-11.
International Search Report and Written Opinion for PCT Application No. PCT/US2021/015303 dated Mar. 30, 2021: pp. 1-12.
International Search Report and Written Opinion for PCT Application No. PCT/US2021/015307 dated Mar. 31, 2021: pp. 1-11.
International Search Report and Written Opinion for PCT Application No. PCT/US2021/015370 dated Apr. 14, 2021: pp. 1-11.
International Search Report and Written Opinion for PCT Application No. PCT/US2021/015371 dated Mar. 31, 2021: pp. 1-11.
Cheng et al., "Tar Elimination from Biomass Gasification Syngas with Bauxite Residue Derived Catalysts and Gasification Char," Applied Energy, vol. 258, Nov. 26, 2019: pp. 1-18.
Das et al., "A Review on Advances in Sustainable Energy Production through Various Catalytic Processes by using Catalysts Derived from Waste Red Mud," Renewable Energy, vol. 143, May 31, 2019: pp. 1791-1811.
Duman et al., "Hydrogen Production from Algal Biomass via Steam Gasification," Bioresource Technology, vol. 166, May 5, 2014: pp. 24-30.
Ebrahiminejad et al., "Hydrocracking and Hydrodesulfurization of Diesel over Zeolite Beta-Containing NiMo Supported on Activated Red Mud," Advanced Powder Technology, vol. 30(8), May 17, 2019: pp. 1450-1461.
Jahromi et al., "Hydrodeoxygenation of Aqueous-Phase Catalytic Pyrolysis Oil to liquid Hydrocarbons Using Multifunctional Nickel Catalyst," Ind. Eng. Chern. Res., vol. 57(39), Sep. 7, 2018: pp. 13257-13268.
Mathur et al., "Ore Catalysts in Two-Stage Coal Liquefaction," FUEL, vol. 65(6), Jun. 1, 1986: pp. 790-796.
Paredes et al., "Catalytic Combustion of Methane over Red Mud-Based Catalysts," Applied Catalysis B: Environmental, vol. 47, Jan. 1, 2004: pp. 37-45.
Smiciklas et al., "Effect of acid treatment on red mud properties with implications on Ni(II) sorption and stability," Chemical Engineering Journal, vol. 242, Jan. 2, 2014: pp. 27-35.

* cited by examiner

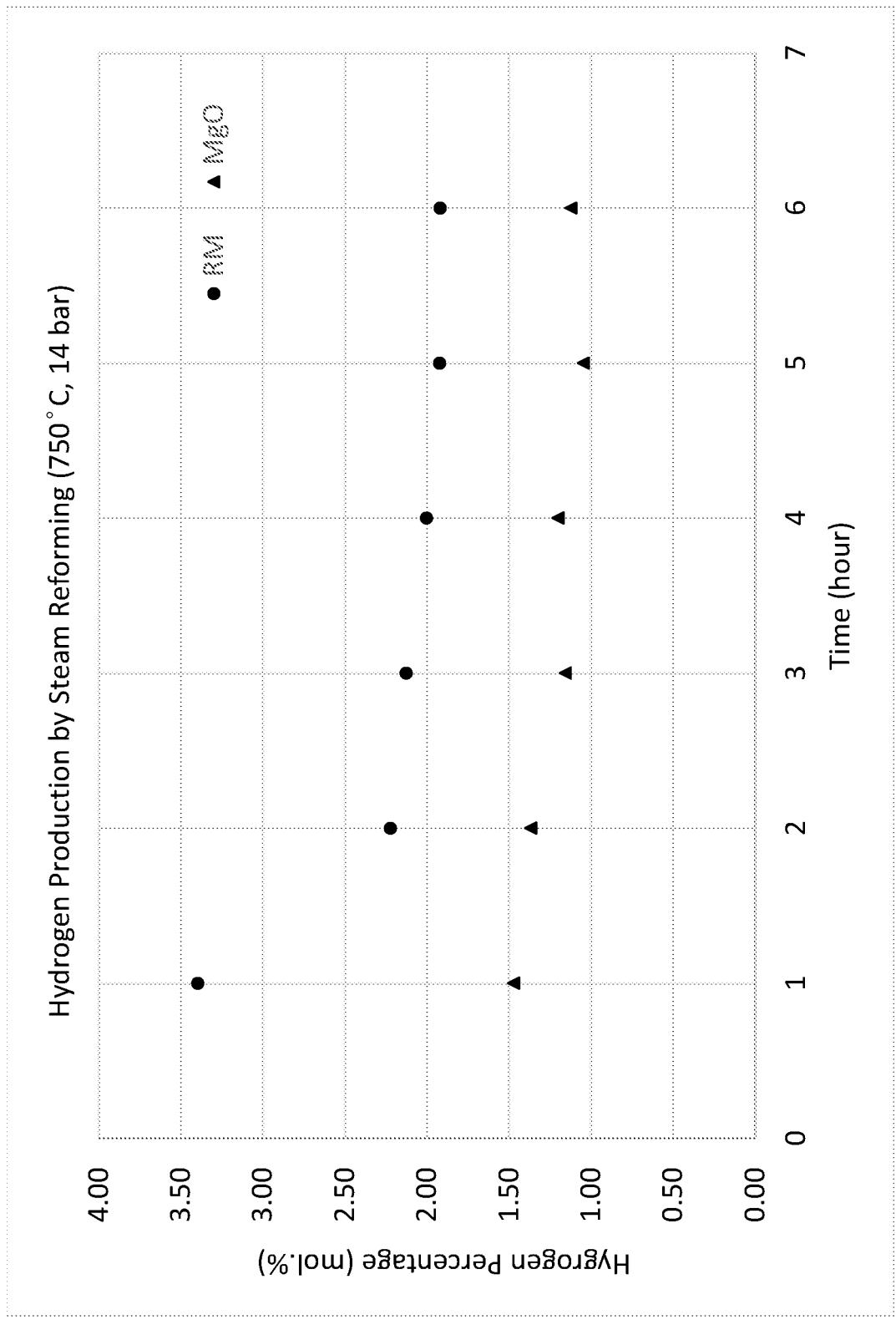

CATALYST CARRIER FOR STEAM REFORMING PROCESSES

BACKGROUND

Field

Embodiments of the disclosure relate to catalyst carrier compositions for use in reforming processes. In particular, certain embodiments of the disclosure relate to catalyst carrier compositions for and methods of steam reforming.

Description of the Related Art

Steam reforming of natural gas is a method of producing commercial bulk hydrogen. Methane and steam are used to produce carbon monoxide and hydrogen (synthesis gas or syngas). In addition, more hydrogen is produced through the water-gas shift reaction. Equation 1 shows the general chemical equation for steam reforming and Equation 2 shows the general chemical equation for the water-gas shift reaction.

$$CH_4 + H_2O \rightleftharpoons CO + 3H_2 \quad \text{Eq. 1}$$

$$CO + H_2O \rightleftharpoons CO_2 + H_2 \quad \text{Eq. 2}$$

One challenge in steam reforming is the high thermodynamic potential for coke formation on catalysts. Other challenges include high energy consumption and $CO_2$ emissions. Nickel catalysts with aluminum oxide and magnesium oxide as supports are used in steam reforming. Catalyst support type and catalytic additives affect the coking tendency of catalysts during steam reforming.

Present catalyst technology is insufficient in some processes to provide cost-effective and durable means for steam reforming.

SUMMARY

Applicant has recognized a need for catalyst carrier compositions comprising red mud to be applied in systems and processes for steam reforming. Red mud catalyst carrier compositions for use in steam reforming are disclosed. The red mud catalyst carrier compositions in some embodiments contain Fe, Al, Si, Na, Ca, and Ti oxides from red mud, and the compositions act as a base support for catalytically active compositions, for example added metals and metal oxides. A factor in designing suitable reforming catalysts is the catalyst support or base material (carrier), which can have an active catalytic role in a catalytic reaction or be merely inert. In embodiments of the present disclosure, red mud acts as a catalyst carrier. Disclosed compositions are useful as a catalyst carrier in steam reforming processes for the conversion of methane to syngas, according to Equation 1 in addition to or alternative to Equation 2. Utilization of red mud in steam reforming processes provides the concurrent advantages of utilizing a waste material (red mud) and producing useful $H_2$.

Red mud is a caustic waste material produced from bauxite ore processing for alumina extraction, and is utilized here as a catalyst carrier for a steam reforming process. Surprisingly and unexpectedly, without being specifically designed as a catalyst or carrier (for example using specific zeolitic structure), red mud waste material can be readily used as a catalyst carrier. Red mud generally includes a mixture of transition metals such as Ti, Fe, and Al, which make it an advantageous catalyst in addition to or alternative to catalyst carrier for steam reforming processes, for example once modified with nickel in addition to or alternative to other metals, such as transition metals and their oxides.

Embodiments disclosed here apply red mud as a catalyst support or base material, while offering some catalytic activity itself for steam reforming of methane. Optionally, the support material can be used in the water-gas shift reaction to produce additional $H_2$ (Equation 2). Red mud compositions of the present disclosure can be used as an active catalyst support, promoter, in addition to or alternative to catalyst in either or both of Equations 1 and 2.

Therefore, disclosed here is a method for steam reforming with a red mud catalyst support composition, the method including providing a methane feed and a steam feed to react over the red mud catalyst support composition at increased temperature and increased pressure to produce synthesis gas comprising $H_2$ and CO, the composition comprising: red mud material produced from an alumina extraction process from bauxite ore. In some embodiments, the composition further comprises at least one added catalytic metal, the added catalytic metal not being present in an unmodified form of the red mud material produced from the alumina extraction process from bauxite ore. Still in other embodiments, the at least one added catalytic metal is a Periodic Table Group 3-12 metal. In certain embodiments, the increased temperature is between about 500° C. to about 1000° C. In other embodiments, the increased temperature is between about 600° C. to about 800° C. In yet other embodiments, the increased temperature is between about 700° C. to about 750° C.

In other embodiments of the method, the increased pressure is between about 5 bar and about 20 bar. Still in certain other embodiments, the increased pressure is between about 7 bar and about 15 bar. In some embodiments, the increased pressure is about 14 bar. In some embodiments, the gas hourly space velocity of the methane feed and steam feed is between about 1000 to 10000 In some embodiments, the composition includes at least one component selected from the group consisting of: $Fe_2O_3$, $Al_2O_3$, $SiO_2$, $Na_2O$, CaO, and $TiO_2$. Still in other embodiments, a majority of the particles of the composition have a particle size of less than about 70 μm. Some embodiments of the method include the step of carrying out a water-gas shift reaction on the syngas produced in the producing step. Still in other embodiments, the step of carrying out the water-gas shift reaction applies the red mud catalyst support composition as a catalyst support. In certain other embodiments, a molar ratio of the steam feed to the methane feed is between about 2:1 and about 4:1. In yet other embodiments, produced $H_2$ is at least about 1.5 mol. % of produced products from the reaction for at least about 5 hours.

In some embodiments, the composition includes between about 20 wt. % and about 30 wt. % $Al_2O_3$, between about 5 wt. % and about 10 wt. % CaO, between about 15 wt. % and about 25 wt. % $Fe_2O_3$, between about 5 wt. % and about 15 wt. % $Na_2O$, between about 15 wt. % and about 25 wt. % $SiO_2$, and between about 5 wt. % and about 10 wt. % $TiO_2$.

BRIEF DESCRIPTION OF THE DRAWING

These and other features, aspects, and advantages of the present disclosure will become better understood with regard to the following descriptions, claims, and accompanying drawing. It is to be noted, however, that the drawing illustrates only several embodiments of the disclosure and is therefore not to be considered limiting of the disclosure's scope as it can admit to other equally effective embodiments.

FIG. 1 is a graph showing mol. % of $H_2$ out of the total products produced from steam reforming of $CH_4$ in a steam reforming process for unmodified red mud (RM) used as a catalyst support and for MgO used as a catalyst support.

DETAILED DESCRIPTION

So that the manner in which the features and advantages of the embodiments of compositions of red mud along with systems and methods for steam reforming with such compositions, may be understood in more detail, a more particular description of the embodiments of the present disclosure briefly summarized previously may be had by reference to the embodiments thereof, which are illustrated in the appended drawing, which form a part of this specification. It is to be noted, however, that the drawing illustrates only various embodiments of the disclosure and are therefore not to be considered limiting of the present disclosure's scope, as it may include other effective embodiments as well.

As noted, red mud is a caustic waste material generated during alumina extraction from bauxite ore. Red mud includes a mixture of transition metals, for example as listed in Table 1.

TABLE 1

| Example composition ranges for global red mud. | | | | | | |
|---|---|---|---|---|---|---|
| Component | $Fe_2O_3$ | $Al_2O_3$ | $SiO_2$ | $Na_2O$ | CaO | $TiO_2$ |
| Approx. Weight Percentage | 30-60% | 10-20% | 3-50% | 2-10% | 2-8% | 10% |

In one embodiment, a Saudi Arabian red mud sample was evaluated for steam reforming activities at 750° C. and 14 bar, as shown in FIG. 1. The results are compared to MgO catalyst support material. MgO is a commercially-available catalyst support material known for a variety of reforming processes with a surface area of about 29 m²/g. The MgO was tested as received. FIG. 1 shows that red mud surprisingly and unexpectedly outperforms MgO as a support for steam reforming catalyst in terms of hydrogen production (also methane conversion according to Equation 1), especially at high pressure which is a preferred condition for industry application of steam reforming.

Saudi Arabian red mud from Ma'aden Aluminium Company, based at Ras Al Khair, Saudi Arabia was used in the test runs. Table 2 shows the weight percent for certain components in the Saudi Arabian red mud composition.

TABLE 2

| Certain component weight percentages in Saudi Arabian red mud (RM) catalyst/catalyst support composition. | | | | | | |
|---|---|---|---|---|---|---|
| Component | $Fe_2O_3$ | $Al_2O_3$ | $SiO_2$ | $Na_2O$ | CaO | $TiO_2$ |
| Weight Percentage | 18.75% | 25.22% | 18.88% | 11.77% | 7.97% | 6.89% |

The red mud was tested as-is without further treatment, for example acid or base treatment, for use as a catalyst support with a Brunauer-Emmett-Teller (BET) surface area of about 16 m²/g.

Several tests on red mud support catalytic activity and MgO support catalytic activity for steam reforming were experimentally conducted. Saudi Arabian red mud was tested as received as a catalyst support without any modifications, and it was placed in a Micromeritics® PID Eng & Tech brand microactivity reactor designed for catalyst activity and selectivity analysis, and similar tests were performed for the MgO catalyst support. The results are compared, for example, in FIG. 1. Results show that red mud support catalytic activity for steam reforming is advantageously improved over MgO support catalytic activity for steam reforming.

FIG. 1 is a graph showing mol. % of $H_2$ out of the total products produced from steam reforming of $CH_4$ in a steam reforming process for unmodified red mud used as a catalyst support and for MgO used as a catalyst support. Experimental conditions in the steam reforming reactor included temperature at about 750° C. and pressure at about 14 bar. In some embodiments, gas hourly space velocity (GHSV) of the mixed feed is between about 1000 and 10000 $h^{-1}$, or GHSV can be between about 4000 $h^{-1}$ to about 6000 $h^{-1}$, or about 5166 $h^{-1}$. The test was conducted for 6 hours. Based in part on thermodynamics, suitable steam to methane molar ratios can be in a range of about 2:1 to about 4:1, for example about 2.84 to 1. In some embodiments, about 30 mol. % $CH_4$ is combined with 70 mol. % steam in a mixed feed. The GHSV was calculated for the mixed feed. For steam reforming, the feed composition will include $CH_4$ and steam. In some embodiments, the feed consists essentially of or consists of methane and steam. GHSV generally measures the flow rate of the feed gases divided by the catalyst volume, which indicates the residence time of the reactants on the catalyst.

Hydrogen production illustrated in FIG. 1 shows red mud catalyst outperformed its counterpart, the MgO. Hydrogen production by red mud reached over 3 mol. %, and remained above 1.5 mol. % at 6 hours. On the other hand, MgO hydrogen production maxed out at below about 1.5 mol. %, then deteriorated. Methane conversion and hydrogen production activity of unmodified red mud can be attributed in part to the existence of several transition metals within red mud.

The singular forms "a," "an," and "the" include plural referents, unless the context clearly dictates otherwise. The term "about" when used with respect to a value or range refers to values including plus and minus 5% of the given value or range.

In the drawings and specification, there have been disclosed example embodiments of the present disclosure, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for steam reforming with a red mud catalyst support composition, the method comprising the steps of:
   providing a methane feed and a steam feed to react in a steam reforming reaction over the red mud catalyst support composition at a temperature between about 500° C. to about 1000° C. and a pressure between about 5 bar and about 20 bar to produce synthesis gas comprising $H_2$ and CO, the red mud catalyst support composition comprising:
   red mud waste material produced from an alumina extraction process from bauxite ore with a weight ratio of aluminum oxide to iron oxide of about 1:0.74 and a weight ratio of aluminum oxide to titanium oxide of about 1:0.27, where produced $H_2$ is at least about 1.5 mol. % of produced products from the steam reforming reaction for at least about 5 hours.

2. The method according to claim 1, where the red mud catalyst support composition further comprises at least one added catalytic metal, the added catalytic metal not originally being present at greater than about 1 wt. % in the red mud waste material produced from the alumina extraction process from bauxite ore.

3. The method according to claim 2, where the at least one added catalytic metal is a Periodic Table Group 3-12 metal.

4. The method according to claim 1, where the increased temperature is between about 600° C. to about 800° C.

5. The method according to claim 1, where the increased temperature is about 750° C.

6. The method according to claim 1, where the increased pressure is between about 10 bar and about 15 bar.

7. The method according to claim 1, where the increased pressure is about 14 bar.

8. The method according to claim 1, where gas hourly space velocity of the methane feed with oxygen and carbon dioxide is between about 1000 $h^{-1}$ to 10000 $h^{-1}$.

9. The method according to claim 1, where the red mud catalyst support composition includes at least one component selected from the group consisting of: $Fe_2O_3$, $Al_2O_3$, $SiO_2$, $Na_2O$, CaO, and $TiO_2$.

10. The method according to claim 1, where a majority of particles of the red mud catalyst support composition have a particle size of less than about 70 μm.

11. The method according to claim 1, further comprising the step of carrying out a water-gas shift reaction on the syngas produced in the producing step.

12. The method according to claim 11, where the step of carrying out the water-gas shift reaction applies the red mud catalyst support composition as a catalyst support.

13. The method according to claim 1, where a molar ratio of the steam feed to the methane feed is between about 2:1 and about 4:1.

14. The method according to claim 1, where the red mud catalyst support composition includes between about 5 wt. % and about 10 wt. % CaO, between about 5 wt. % and about 15 wt. % $Na_2O$ and between about 15 wt. % and about 25 wt. % $SiO_2$.

* * * * *